United States Patent
Matsumoto et al.

(10) Patent No.: US 6,851,020 B2
(45) Date of Patent: Feb. 1, 2005

(54) STORAGE SUBSYSTEM THAT CONNECTS FIBER CHANNEL AND SUPPORTS ONLINE BACKUP

(75) Inventors: Yoshiko Matsumoto, Minamiashigara (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 586 days.

(21) Appl. No.: 09/820,947

(22) Filed: Mar. 30, 2001

(65) Prior Publication Data

US 2002/0124124 A1 Sep. 5, 2002

(30) Foreign Application Priority Data

Mar. 2, 2001 (JP) .................................... 2001-057631

(51) Int. Cl.⁷ .............................................. G06F 12/00
(52) U.S. Cl. ............................. 711/112; 711/162; 714/6
(58) Field of Search ........................ 711/111, 112, 113, 711/114, 154, 162, 165, 161; 714/5, 6, 8

(56) References Cited

U.S. PATENT DOCUMENTS

| | | | |
|---|---|---|---|
| 6,000,020 A | * | 12/1999 | Chin et al. .................... 711/62 |
| 6,219,753 B1 | * | 4/2001 | Richardson .................. 711/114 |
| 6,304,980 B1 | * | 10/2001 | Beardsley et al. ........... 711/162 |
| 6,332,198 B1 | * | 12/2001 | Simons et al. ................. 714/6 |
| 6,665,812 B1 | * | 12/2003 | Blumenau et al. .......... 711/162 |
| 6,694,450 B1 | * | 2/2004 | Kidder et al. ................. 714/15 |
| 6,697,960 B1 | * | 2/2004 | Clark et al. ..................... 714/6 |

FOREIGN PATENT DOCUMENTS

JP      6290002      10/1994

* cited by examiner

*Primary Examiner*—Pierre Bataille
(74) *Attorney, Agent, or Firm*—Antonelli, Terry, Stout & Kraus, LLP

(57) ABSTRACT

A disk array connected to a storage area network via a fiber channel has one or more ports each controlled by a processor. Even the disk array with one port and one processor executes online processing and backup processing at the same time while considering an online processing load. A port controller not only accepts a request from a host computer but issues a request to other storage controllers to allow online processing and backup processing to be executed at the same time. In addition, the disk array, if provided with a plurality of ports, selects ports or schedules processing depending upon the load to prevent backup processing from affecting online processing performance.

57 Claims, 5 Drawing Sheets

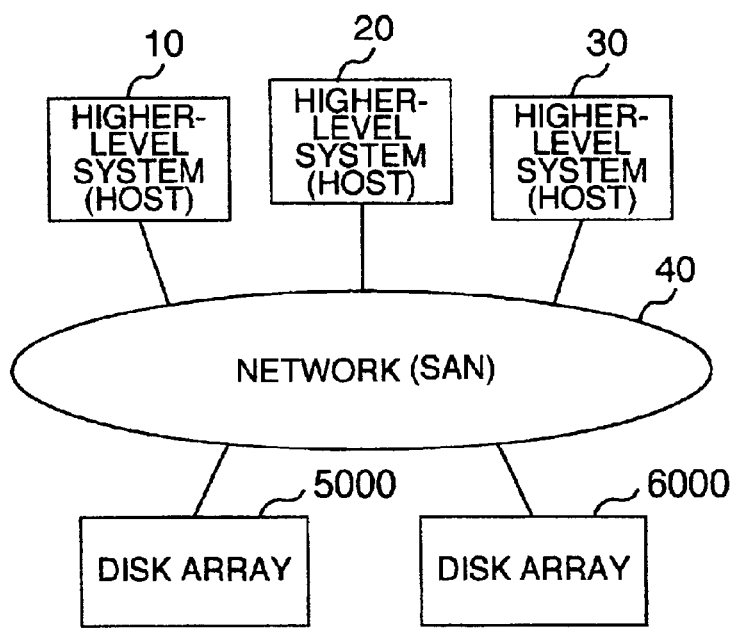
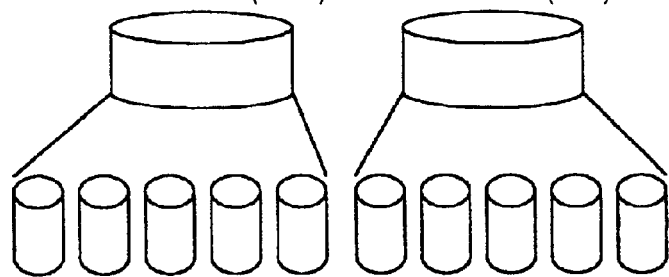

DISK ARRAY CONTROLLER

USER SPECIFIED PORT INFORMATION (IN CACHE)

COPY/BACKUP TIMING INSTRUCTION INFORMATION (IN CACHE)

TIME SUPERVISION INSTRUCTION INFORMATION (IN CACHE)

PRIORITY INFORMATION (IN CACHE)

STORAGE SUBSYSTEM THAT CONNECTS FIBER CHANNEL AND SUPPORTS ONLINE BACKUP

BACKGROUND OF THE INVENTION

1. Field of the Invention

The present invention relates to a storage system, and more particularly, to a storage system that connects to a computer system requiring high availability.

2. Description of the Related Art

A present-day computer system, combined with electronic commerce, is required to run continuously, —24 hours a day, 365 days a year. The computer system is also required to ensure integrity as the amount of information to be maintained increases every year. Among these required functions is the data backup function that immediately recovers data that might be lost by device errors.

In general, data recorded on an external storage system (storage system) such as a hard disk is copied regularly to a tape and so on for saving (creating a backup) thereon to allow lost data to be recovered in the event of a device error, software error, or operation error. At this time, it is required to save backup data in the precise image at the time it is saved and to continue regular online processing while performing backup processing. To do so, data accessed online is duplexed to some other volume, and backup processing is performed for data on the duplexed volume while online processing is performed. Online processing during backup processing is performed with update data on the other volume.

Conventionally, a program running on a host computer has managed backup processing like this.

For example, U.S. Pat. No. 5,649,152 discloses a technology for allowing a backup program in the host computer to execute all necessary operations—management of data duplexing, data saving at a specific point in time, instruction of data backup to some other storage system, and so on.

U.S. Pat. No. 5,051,887 discloses a technology for continually creating a dual copy of data in the controller under control of a host computer. However, this method gives a heavy load to the data transfer path between the host computer and a controller.

One of data duplexing methods for use in an external storage system is to perform backup management, conventionally done by a program running in a computer, in the external storage system. An example of this technology is disclosed in U.S. Pat. 5,845,295. According to this technology, duplexing may be managed, and data may be saved, in an external storage system. When creating a backup copy of data, the host computer issues a READ (hereinafter RD) request to the external storage system, reads data from it, and then issues a WRITE (hereinafter WR) request to some other storage system to write the data. That is, the external storage system simply transfers data to a host computer in response to an instruction from the host computer.

Subsequently, U.S. Pat. No. 5,742,792 discloses a technology for copying data to some other storage system, not by an instruction from the host system, but directly by an external storage system. This method allows data to be copied in the background while performing online processing. This technology, applicable also to backup processing, may be used to execute data backup processing while executing long continuous operation.

As described in the prior art, the technology for executing data backup processing while executing long continuous operation is already established. However, external storage systems used in the disclosed technology are large external storage systems. When executing data backup processing and online processing, the data transfer portion of a large external storage system, that is, the data connection portion connected to a host computer and the connection portion (hereinafter called port) of a backup unit are implemented by separate hardware units. This is because a plurality of hardware units are installed in a large external storage system to allow redundancy. The prior art is applicable to the large external storage system described above.

However, a small external storage system connected to a workstation or a personal computer, if redundant in configuration, increases the cost and does not bring out an advantage offered by a small-sized system. Like a large external storage system, a need arises for a small external storage system to execute backup processing while executing long continuous operation. A first problem to solve is how to meet this need with less hardware.

In addition, if data is updated during duplexing in a conventional backup method in which an instruction is given by the host, the update of data during duplexing requires four times of transfer operation between the external storage system and the host computer (two WRs(Write) for duplexing, RD(Read) for backup, and WR(Write) for another storage system). This increases the bus load between the host computer and the storage system, affecting the performance of daily applications.

In particular, the backup operation of a large amount of data, which requires the processor in the external storage system to spend much time in the backup operation, degrades application performance for a long time until the backup operation ends. Recently, although more and more external storage systems employ the duplexing function, this function sometimes degrades the performance of daily online processing during backup processing. In addition, a small- to medium-size disk array controller for an open systems environment has only one data transfer path between the controller and the host computer. In a system using this path as a bus, the daily online processing must be stopped to execute backup operation.

SUMMARY OF THE INVENTION

It is a first object of the present invention to provide an external storage system with a port controller having one port that is used as a connection portion between a host computer and the external storage system for backup operation and that is capable of executing backup operation and daily online processing at the same time or alternately.

It is a second object of the present invention to provide a storage controller capable of executing backup processing without degrading online processing performance.

To solve the above problems, a storage system according to the present invention comprises a communication port that transfers data to or from a host computer and other storage controllers, a cache memory in which control information and data from the host computer are stored, storage devices such as a disk device group in which data from the host computer is stored, and a controller that controls the communication port, cache memory, and storage devices. The port controller, which has a port, multiplexes communication processing. The host computers and other external storage systems for backup processing are connected via a fibre network. Control information comprises information for executing an I/O request from a host computer via each communication port, transfer information for executing backup processing for other storage controllers, load information for each communication port, information for managing the progress of backup processing, information specified by the user indicating whether each port is for online processing only, backup processing only, or online and backup processing, information for controlling data duplexing, and information specified by the user for specifying when to start duplexing and backup processing. The information is written in the cache memory as necessary.

BRIEF DESCRIPTION OF THE DRAWINGS

FIG. 1 is a diagram showing the configuration of a network environment used in an embodiment of the present invention.

FIG. 3 is a diagram showing an example of the configuration of a disk device group used in the embodiment of the present invention.

DETAILED DESCRIPTION OF THE EMBODIMENTS

An embodiment of the present invention will now be described with reference to the drawings.

FIG. 1 shows an example of the configuration of the whole system including a disk array used in the embodiment. In FIG. 1, numerals 10, 20, and 30 indicate host computers (higher-level systems), and numerals 5000 and 6000 indicate disk arrays (external storage systems (storage systems) connected to host computers). The host computers and disk arrays are connected by fibre channels via fabric switches to form a storage area network (SAN) 40. Disk arrays 5000 and 6000 may each be online to the host computers to execute online processing, and the disk array 6000 may be used as a backup of the disk array 5000.

In this embodiment, assume that the disk array 5000 duplexes data while executing online processing with the host computers and transfers backup data to the disk array 6000. An external storage system (storage system) that receives backup data need not be a disk array. For example, the backup device may be a magnetic tape library or an optical disc.

Figure 2:
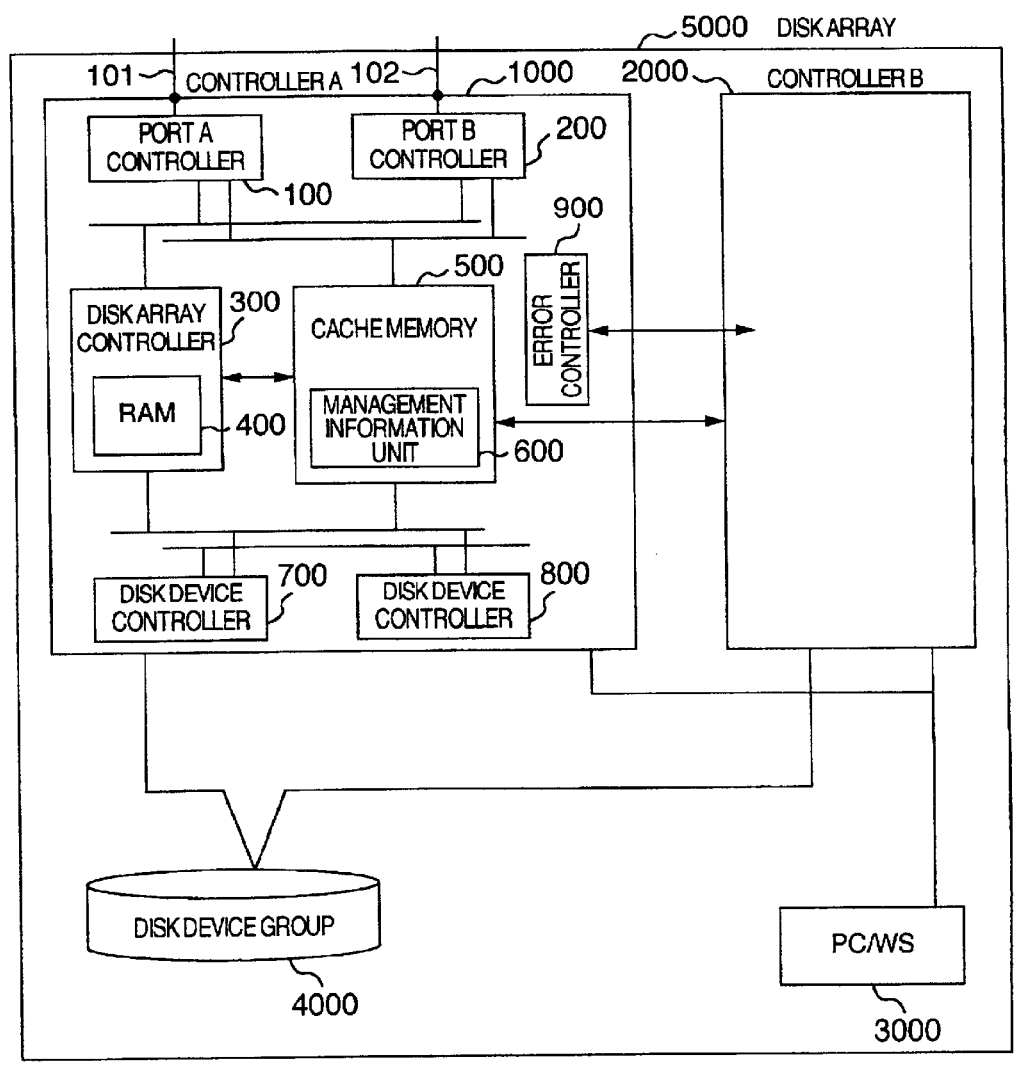
FIG. 2 is a diagram showing the configuration of a disk array controller used in the embodiment of the present invention.

FIG. 2 shows the configuration of a disk array. The disk array 5000 comprises a controller A 1000 and a controller B 2000 which are in the dual configuration, a disk device group 4000 which stores thereon data from the host computers, and a personal computer/workstation (PC/WS) 3000 from which the operation of the port controller in each controller is specified. The disk device group 4000 is usually has an array configuration.

Next, controllers A and B will be described. Because controllers A and B have the same configuration, controller A will be described.

Controller A comprises a cache memory 500, port A (101) via which data is transferred and a port A controller 100 that controls port A, and port B (201) via which data is transferred and a port B controller 200 that controls port B. These ports are connected to the fibre channels and form a network using the fabric switches.

Controller A further comprises a disk array controller 300 that controls controller A in its entirety, and the disk array controller 300 comprises a RAM 400 in which various types of information for controlling the controller is stored. The disk array controller 300 also has the timer function (not shown in FIG. 2).

The cache memory 500 described above is usually a non-volatile memory. In this embodiment, data in the cache memory 500 is written also in the cache memory of controller B. In addition to a data unit in which data from the host computers is temporarily stored, the cache memory 500 has a management information unit 600 which manages the information on, and status of, the data.

Controller A has disk device controllers (drive controllers) 700 and 800 that control the disk device group 4000. The disk device controllers transfer data to or from the disk devices in the disk device group. A disk device, composed of a storage drive storing thereon data and a drive controller controlling the drive, is connected to the disk controller via the SCSI interface or a fibre channel.

In this embodiment, controller A, which is connected to the higher-level systems (host computers) via fibre channels, has two ports. Upon detecting an unrecoverable error in controller A, an error controller 900 notifies controller B of the detected error. In response to the notification, controller B receives data and management information from the cache memory and continues execution that has been executed in controller A.

FIG. 3 shows the configuration of a disk device group. The disk device group, built in an array configuration, may have a plurality of logical volumes allocated to it. The sub-volumes of a logical unit allocated for use in backup processing may be set in each (main) logical volume, or a volume group may be allocated as a work volume for duplexing.

Figure 4:
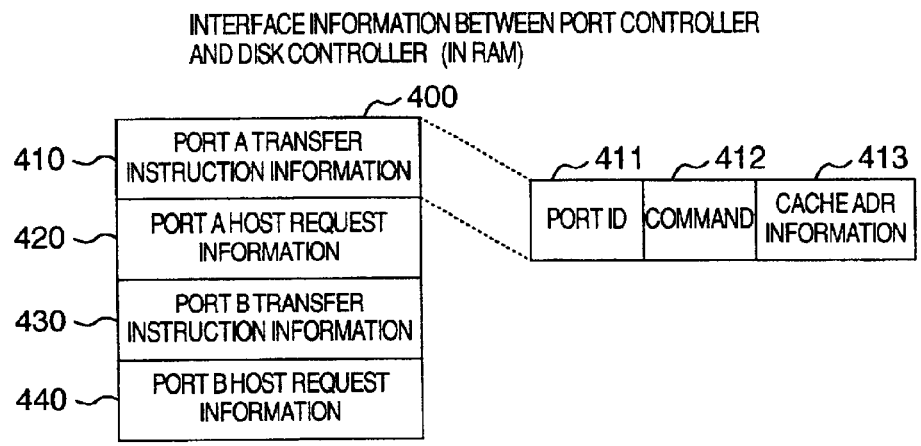
FIG. 4 is a diagram showing an example of interface information between a port controller and a disk controller used in the embodiment of the present invention.

FIG. 4 shows interface (I/F) information used for transferring data between the port controller 100/200 and the disk array controller 300. The interface information comprises transfer instruction information 410 (port A) and 430 (port B) used when transferring data from each port to another storage controller and host request information 420 (port A) and 440 (port B) used when transferring an I/O request from a host computer to the disk array controller 300. Each information unit comprises a port ID (411), a command 412, and cache ADR (address) information 413. For the transfer instruction information, the port ID identifies to which device in the storage area network a data transfer request is to be transferred; for the host request information, the host ID identifies from which device a data transfer request is to be transferred. More specifically, the port ID corresponds to the AL-PA (Fibre Channel Arbitrated Loop or FC-AL) of the fibre channel. The command information 412 identifies the operation type, RD or WR. The cache ADR information 413 contains information indicating a location within the storage system to or from which data to be transferred. The information described above is managed in the RAM.

When an I/O request is received from a host via the fibre channel, the port A controller sets the port A host request information 420 to notify the disk array controller 300 of the I/O request. Like the port host request information 420, the port B controller sets the port B host request information 440. The disk array controller references the information 420 and 440 and controls the disk device group 4000 and cache memory 500 to execute the I/O request.

On the other hand, the port A transfer instruction information 410 is set when backup data is transferred from the (sub)logical volume of the disk device group 4000 to another storage controller. The port A controller 100 references the port A transfer instruction information 410 and issues a command via the fibre channel. When issuing a command to some other storage system, the port ID of the other storage system is set in the port ID. The other storage controller receives this command, executes it, and stores backup data on the recording medium. Like the port A transfer instruction information 410, the port B transfer instruction information 430 is used by the port B controller 200.

The port A transfer instruction information 410 and the port A host request information 420 are used, as described above, in the interface between the port controller 100 and the disk array controller during data communication between a host computer and a backup device. These two types of information are used as follows. That is, the port A host request information 420 is used when an access request is received from some other device; on the other hand, the port A transfer instruction information 410 is used when the disk array controller sends an access request to some other device. Therefore, when the disk array controller wants to send a transfer instruction to a host computer, it uses the port A transfer instruction information 410. That is, the port controller 100 specifies the port ID of the host computer to transfer data to the host computer. Conversely, when an access request is received from a backup device, the port A host request information 420 is used. In this way, the port controller 100 switches the port ID of the port A transfer instruction information 410 between a host computer and a backup device to execute communication.

Figure 5:
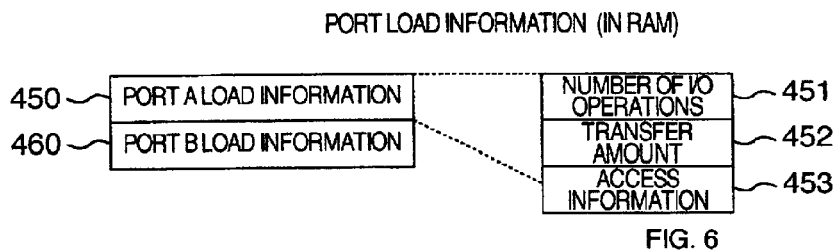
FIG. 5 is a diagram showing an example of port load information used in the embodiment of the present invention.

FIG. 5 shows load information table for each port. Port load information 450 is information on port A, while port load information 460 is information on port B. This information is collected from each port. The information is composed of a number of I/O operations 451 indicating the total number of I/O operations for a predetermined period of time, a transfer amount 452, and access information 453. When the disk array receives an I/O request from the host computer and the disk array controller 300 identifies the host request information, the data transfer length and the command are obtained from the command information 412. The data transfer amount is the transfer length specified by RD(Read) or four times the transfer length specified by WR(Write) (four times considering the number of times data is transferred for data updating processing during duplexing). The command information on the current command is compared with the command information on the previous command stored in the RAM 400 to check if the access is continuous (sequential) or random. The number of I/O operations 451 is incremented by one, the data transfer length is added to the transfer amount 452, and the access type (sequential or random) is written in the access information 453. Note that this information is cleared periodically to collect information per unit time. The timer function in the disk array controller 300 is used to maintain the information for a specific period of time. This information is stored in the RAM 400.

Figure 6:
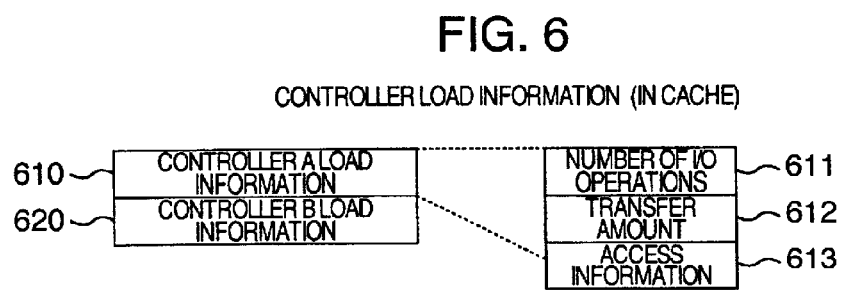
FIG. 6 is a diagram showing an example of controller load information used in the embodiment of the present invention.

Controller A load information 610 shown in FIG. 6, a numeric total value of the port A load information and the port B load information within controller A, is stored in the management information unit 600 in the cache memory 500. The disk array controller 300 also sets up the controller A load information when it receives a command. Controller B load information 620 is the same as the controller A load information 610.

Figure 7:
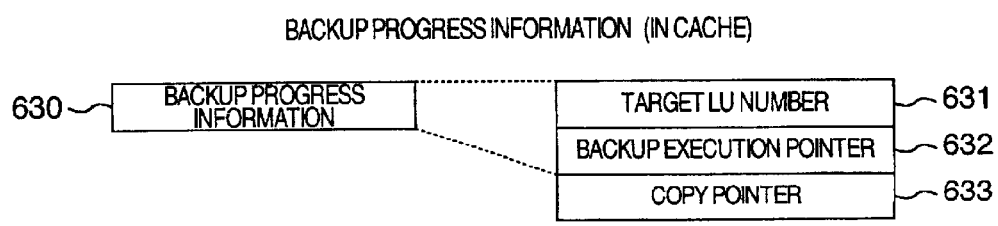
FIG. 7 is a diagram showing an example of backup progress information used in the embodiment of the present invention.

Backup progress information 630, shown in FIG. 7, is stored in the management information unit 600 in the cache memory 500. This information is composed of the number (target LU number) 631 of a logical volume for which backup processing is being executed and a backup execution pointer 632 indicating the progress of backup processing. When a backup instruction is received from a host computer, the disk array controller 300 also writes the logical number of the volume for which backup processing is to be performed into the target LU number 631, sends the backup instruction to the port controller 100 or 200 and, at the same time, updates the backup execution pointer 632.

A copy pointer 633 is used when duplexing data. The copy pointer 633 indicates to what point data has been duplexed. During data duplexing, the locations in which duplexing has been done are sequentially updated. When backup processing is executed at the same time, the copy pointer 633 is referenced to control backup processing so that backup processing is executed for data within the range not exceeding the location pointed to by this pointer. This allows backup processing to be performed for a part where data has been duplexed.

Figure 8:
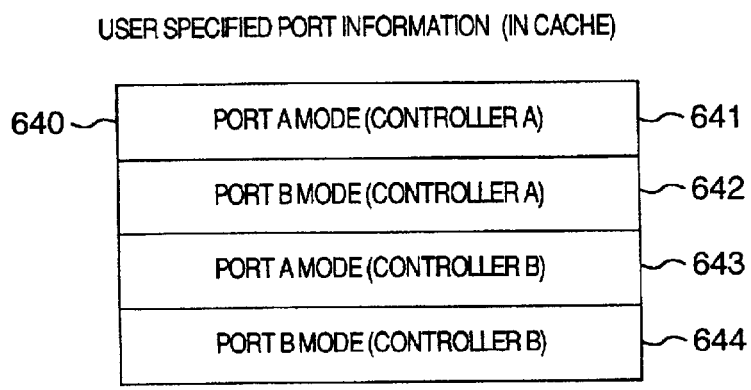
FIG. 8 is a diagram showing an example of user-specified port information used in the embodiment of the present invention.

A user-specified port information table 640, shown in FIG. 8, is stored in the management information unit 600 in the cache memory 500. This table contains a port usage value specified by the user via the personal computer/workstation (PC/WS) 3000. More specifically, the user specifies a value indicating that the port is for backup processing only, a value indicating that the port is for online processing only, or a value indicating the port is for both online processing and backup processing. When a backup request is received, the disk array controller 300 references this information, searches for a backup port, and issues the request to the port controller of the port.

Figure 9:
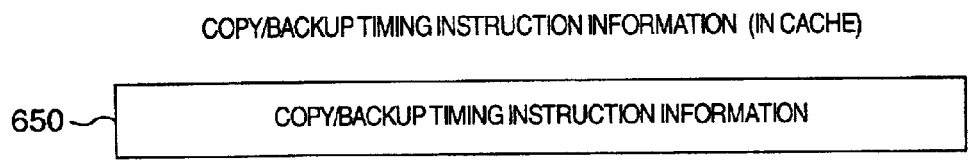
FIG. 9 is a diagram showing an example of copy/backup timing information used in the embodiment of the present invention.

A copy/backup timing instruction information table 650, shown in FIG. 9, is stored in the management information unit 600 in the cache memory 500. This table contains information indicating when to execute copy processing for duplexing and subsequent backup processing specified via the personal computer/workstation (PC/WS) 3000. Usually, the PC/WS is connected to the controller via a LAN.

Figure 10:
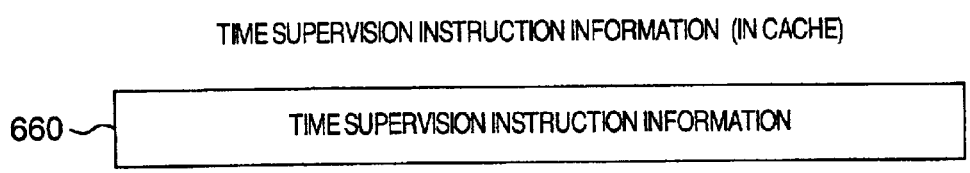
FIG. 10 is a diagram showing an example of time supervision instruction information used in the embodiment of the present invention.

A time supervision instruction information table 660, shown in FIG. 10, is stored in the management information unit 600 in the cache memory 500. When the copy/backup timing instruction information table 650 shown in FIG. 9 indicates a time, the time information is set in the time supervision instruction information table 660.

Figure 11:
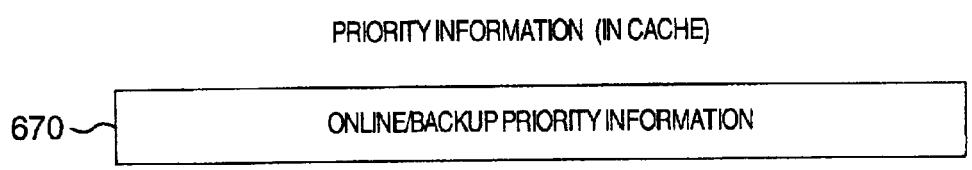
FIG. 11 is a diagram showing an example of priority information used in the embodiment of the present invention.

FIG. 11 shows a priority information table 670. This table contains a value indicating to what processing, online processing or backup processing, the disk array controller assigns priority. The user specifies this value in advance from the personal computer/workstation (PC/WS) 3000. The disk array controller 300 references this information when it starts backup processing. If backup processing has priority, the controller transfers a predetermined amount of data. Then, the controller checks if an online processing request is present. If no online processing request is present, the controller performs backup processing for a predetermined amount data. Conversely, if online processing has priority, the controller executes only online processing for a predetermined time and, then, transfers a predetermined amount of backup data, and then executes online processing for a predetermined time. The larger the predetermined amount of backup data, the higher the backup priority. The longer the predetermined online processing time, the higher the online processing priority.

The configuration of controller A has been described with an example. The configuration of controller B is the same as that of controller A.

Next, the basic RD(Read)/WR(Write) operation of the disk array controller will be described. Upon receiving an RD request from a host computer, the port controller 100 sets the request in the port A host request information 420. The disk array controller 300 references the port A host request information 420, finds that the request is an RD request, and checks the requested ADR(address) and the data length. If the requested data is in the cache memory 500, the controller notifies the port A controller of the cache ADR (address) and instructs that the data be sent to the host computer from which the RD request was received. If the requested data is not in the cache memory, the controller reads the requested data from the disk device group 4000, stores it in the cache memory 500, and transfers it to the host computer.

Upon receiving a WR request from a host computer, the port controller 100 sets the request in the port A host request information 420. The disk array controller 300 references the port A host request information 420, finds that the request is a WR request, and checks the requested ADR (address) and the data length. After transferring data to the cache memory 500, the controller requests the port controller to inform the host computer that data has been transferred. After that, the controller a synchronously sends (writes) data from the cache memory 500 to the disk device group.

Next, the one-port parallel operation of online processing and backup processing, the basic function of the present invention, will be described. Note that a host computer request described below may be issued from the host computer as one of standard commands or may be entered from a personal computer/ workstation (PC/WS).

Figure 12:
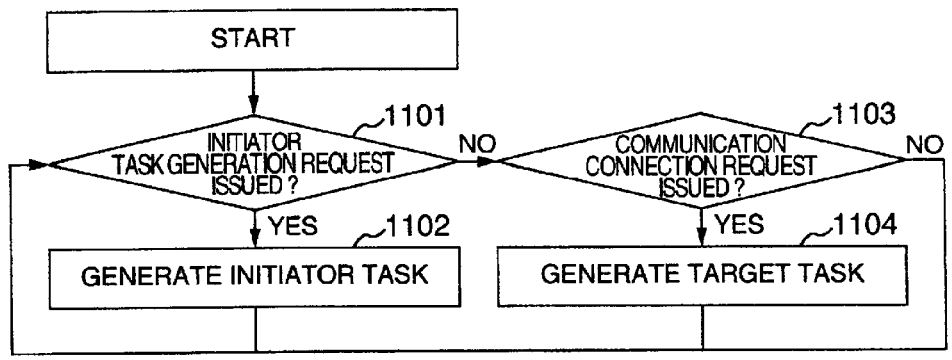
FIG. 12 is a flowchart of the generation of an initiator task and a target task in a port controller 100.

First, referring to FIG. 12, the communication processing in which online processing and backup processing are executed in parallel via the port controller 100 will be described. In FIG. 12 and the following figures, it is assumed that the port controller is connected via a fibre.

When the port controller is connected via a fibre, a chip set, for example, a Emulex's chip set, is used. Within this chip set is a chip, called 2410020, that executes the fibre protocol control. This chip set allows a port to duplex communication, for example, to execute two types of processing, online processing with the host computer and backup processing with the backup device, at the same time in a time-sharing manner. Communication multiprocessing using this chip set will be described with reference to the flowcharts shown in FIG. 12 and following figures.

FIG. 12 is a flowchart showing how to control the generation of an initiator task and a target task. In step 1101, the port A controller 100 references the port A transfer instruction information 410 to check if the disk array controller 300 has issued an initiator task generation request. For example, when executing backup processing, the disk array controller 300 sets a transfer request in the port A transfer instruction information 410 to request the generation of the initiator task. In response to this transfer request, the port A controller 100 executes step 1102 that follows.

In step 1102, the initiator task for executing the requested data transfer is generated. Note that this initiator task executes processing specified by the port A transfer instruction information. Therefore, this task not only sends but receives data. When sending backup data to a backup device, the initiator task is generated with the backup destination device information as the parameter.

On the other hand, if there is no transfer request in step 1101, the port controller checks in step 1103 if there is a connection request from some other host computer. In step 1103, the port A controller 100 checks if there is a transfer request from some other storage system or a host computer. The transfer request in this context is, for example, a Login request from some other storage system. If there is a transfer request from some other storage system, step 1104 is executed. In step 1104, a target task for executing transfer processing in response to the transfer request is generated. This target task is executed in response to an access request from some other storage system. Therefore, this task not only receives but sends data. In the flowchart, when the initiator task or the target task is generated, control returns to step 1101. Therefore, the port controller waits for the next transfer request without wait for the generated task to be completed. The above description implies that the initiator task and the target task, though in a time-sharing manner, may be executed almost at the same time. At this time, because packet data may be sent in a time-sharing manner over the fibre channel, data may be sent or received over the fibre channel network even if the port A controller 100 executes two or more tasks at the same time.

Figure 13:
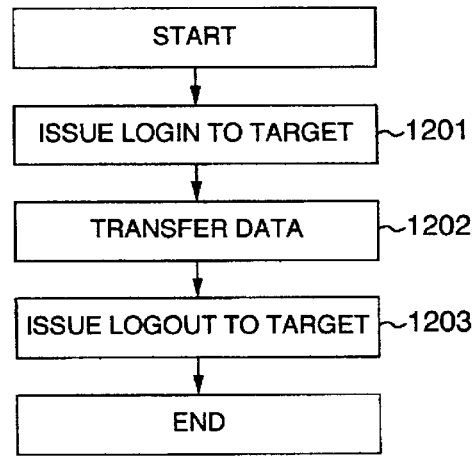
FIG. 13 is a flowchart of the initiator task in the port controller 100.

FIG. 13 is a flowchart showing the processing executed by the initiator task. The initiator task is, for example, a communication task by which the disk array controller 300 transfers data to some other storage system for backup processing. More specifically, in step 1201, the controller issues the Login command to connect to the destination storage system. If Login is authenticated, the controller sends data to the destination storage system in step 1202. During data transfer, the controller sends data in most cases except when data transfer authentication is executed, in which case, the controller sends and receives data. After completion of the data transfer, the controller issues the Logout command in step 1203.

Figure 14:
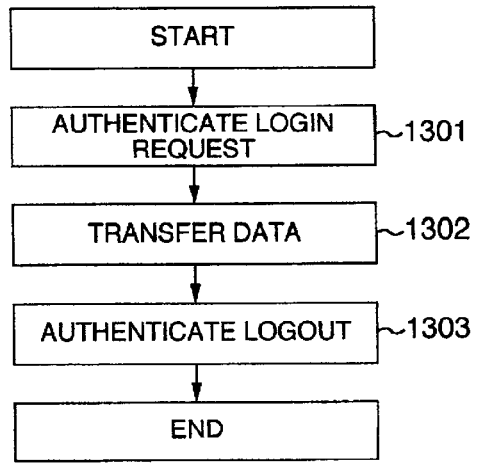
FIG. 14 is a flowchart of the target task in the port controller 100.

FIG. 14 is a flowchart showing the processing executed by the target task. The target task is a task by which the controller sends and receives data I/O commands to or from a host computer, for example, when executing online processing with the host computer. For example, when the READ command is received from the host computer, the disk array controller 300 that receives the command sends data to the host computer.

In step 1301, the controller authenticates Login sent from the other storage system. To do so, the controller references the management information unit 600 in the cache memory 500 to check if the other storage system is valid. The management information unit 600 contains the identifiers of the hosts and other storage systems allowed to connect to this storage system. The controller references this information to decide whether the other storage system is allowed to connect to this storage system. If the other storage system is successfully authenticated, the next step 1302 is executed; if the other storage system is invalid, the controller sends an error notification and stops processing. In step 1302, the controller processes the data transfer request sent from the other storage system. During data transfer, the controller receives data in most cases except when data transfer authentication is executed, in which case, the controller sends and receives data. After completion of the data transfer, the Logout command is issued in step 1303. In step 1303, after the data transfer with the other storage system ends, Logout issued from the other storage system and the detected Logout is authenticated.

As shown in the flowcharts described above, the initiator task and the target task may be multi-processed. Although there is only one port, online processing and backup processing may be executed at the same time.

Next, operation that is executed when there are two or more ports will be described.

In this case, because there are two or more ports, ports may be assigned to online processing and backup processing, one for each. In that case, it is necessary to judge which port to select depending upon the load status of each port. The following describes the logic using the disk array 5000 comprising two controllers, A and B.

First, the disk array controller 300 compares a transfer amount 612 included in the controller A load information 610 with that included in the controller B load information 620. The controller with the larger transfer amount is determined as the controller with a heavy load. If both controller have the per-unit-time transfer amount that is not so large, the disk array controller compares the number of I/O operations 611 of one controller with that of the other to judge the load. If controller A is determined to have a heavier load, the disk array controller 300 references the port load information stored in the RAM 400 in controller A.

More specifically, the disk array controller references the access information 453 in the port A load information 450. The access information 453 indicates the type of I/O processing, sequential or random, requested by the host computer. If the I/O processing of a port requested by the host computer is sequential, the port is assumed to have a heavy load. When the I/O processing of both ports is sequential, the disk array controller compares the transfer amount 452 of one port with that of the other port to judge the load. When the I/O processing of both ports is random, the disk array controller compares the transfer amount 452 of one port with that of the other port. A port with the lighter load is thus selected to minimize an effect on other processing such as online processing.

Next, the port selection logic for use when backup processing is sequential will be described. In the description below, it is assumed that disk array 5000 has two controllers each with two ports. In this case, a total of four ports are provided.

Assume that, in the disk array 5000, sequential processing is executed on three ports and random processing on one port. Because backup processing is sequential, selecting a port, on which sequential processing is now executed, for backup processing would increase the load. Therefore, not a sequential-access port but a random-access port is selected for backup processing. This increases backup processing efficiency with no effect on online processing.

Next, switching backup processing from one port to another according to the port load status will be described. Because the port load continually changes, it is necessary to check the load status of the ports and, depending upon the port load status at a specific point in time, to search for a port with a load lighter than that of the port on which backup processing is being executed. Then, backup processing is taken over to the port with a lower load. Selection of a port is performed as follows. The controller references the load information, described above, at a regular interval and selects a port with a load lighter than that of the previously-selected port. Backup processing is switched as follows. The port that is executing backup processing keeps the backup progress information 630 updated during execution. When backup processing is switched from one port to another, the port that starts backup processing references the backup progress information 630 and obtains the target LU number 631 and the backup execution pointer 632 to take over the backup progress status. In addition, if it is found that the load of a plurality of ports is light, for example, at night, backup processing may be distributed among them. More specifically, the backup progress information stored in the cache is referenced and updated for backup processing. Switching backup processing from one port to another in this manner makes backup processing more efficient. It is possible to execute backup processing intensively when the user need it, for example, at night or on week ends.

Not only a host computer but the user on a personal computer/workstation (PC/WS) may start backup processing. The user on the personal computer/workstation (PC/WS) requests the disk array controller 300 to start backup processing. At this time, the user may even specify a port on which backup processing it to be executed. What's more, the user on the personal computer/workstation (PC/WS) may specify the type of processing to be allocated to each port. For example, the user may specify that a port is for backup processing only, for online processing only, or for both online processing and backup processing. The disk array controller references this information to select a port for backup processing. In addition, the user may specify that backup processing be executed with priority on online processing. The user may even specify a precedence ratio.

Moreover, backup processing may be started, not by the user, but automatically at a specified backup start time that is set on the personal computer/workstation (PC/WS).

Port selection, backup switching, and user's backup operations have been described above. Next, recovery from a backup processing error, as well as backup processing for a non-online volume to which data has been copied, will be described.

First, recovery from a backup processing error will be described.

When an error occurs in a controller during backup processing, the error controller 900 in the other controller detects the error, references the backup progress information

630 in the cache memory 500, and continues backup processing. This allows the failing controller to be disconnected from the disk array and to be replaced to recover from the error. After error recovery, backup processing may also be switched as described above.

Next, parallel execution of backup processing and volume copy processing will be described. Volume copy processing refers to duplexing in which data is copied from one volume to another. When a logical volume is copied to another volume, two logical volumes, main(source) and sub (destination), are present in the physical disk device group. When the host computer executes an I/O operation for the main (copy source) volume, the result of the operation is reflected on the sub-volume to maintain the duplexed state.

This function is used during backup processing as described below. Online processing is executed for the main logical volume (copy source), while backup processing is executed for the sub logical volume. During backup processing, the duplexed state is temporarily suspended to enable backup processing to be executed for data recorded on the sub logical volume at the suspension point.

At this time, an increase in the capacity of the main logical volume increases the duplexing load, sometimes affecting online processing significantly. In addition, backup processing that is executed after duplexing takes long. To avoid these problems, the system according to the present invention executes volume copy processing and backup processing in parallel to reduce backup data collection time and the subsystem load, thus preventing performance from being degraded.

As a matter of fact, data is transferred to or from the transfer path via the cache memory 500 in the controller. For example, data is staged from the normal main volume to the cache memory, is written from the cache memory to the sub logical volume, is staged from the sub logical volume to the cache memory to transfer backup data, and is transferred from the cache memory to the fibre channel. These operations increase the internal bus load and degrades online processing performance of the system.

To reduce the load, data to be staged from the main logical volume to the cache memory 500 for duplexing is transferred directly as backup data. This reduces the bus load and prevents online processing performance from being degraded. Parallel execution of logical volume duplexing processing and backup processing reduces the time needed for backup processing.

Volume copy processing and backup processing, if combined, find many applications in a variety of needs and operations. For example, some application requires both a replica of data stored in a logical volume at a specific point in time and a backup copy on the weekend. To satisfy the requirement like this, the system according to the present invention allows the user on the personal computer/workstation (PC/WS) to specify when to create a data copy and a backup copy. In response to a duplexing request, the disk array controller 300 references the copy/backup timing instruction information table 650 and, if parallel control is specified, performs parallel control as described above. If parallel control is not specified, the disk array controller performs copy processing. In addition, a request to start backup processing at a specific time, for example, a request to start backup processing immediately after midnight, may be specified in the time supervision instruction information table 660. The disk array controller compares the current time with this information at a regular interval and, when the specified time arrives, starts backup processing.

The present invention provides a disk array controller connected with a fibre channel in a network environment such as a storage area network. This disk array controller can execute online processing and backup processing at the same time even in a one-port configuration. This controller performs backup processing according to the load or at a specified time while maintaining online processing performance. In addition, even if a controller error or a port error occurs, another port or another controller continues processing. The controller according to the present invention controls copy processing and backup processing at the same time and allows the user to specify a combination of copy processing and backup processing for execution.

While the preferred form of the present invention has been described, it is to be understood that the present invention is not limited to the embodiments but that modifications will be apparent to those skilled in the art without departing from the spirit of the present invention.

We claim:

1. A disk controller for use in a network environment composed of one or more host computers and one or more disk controllers, each of said disk controllers controlling storage media according to an instruction from the host computers, each of said disk controllers comprising:

a plurality of controllers each having at least one port for controlling a bus protocol between the host computers and a storage system including said disk controllers; and a cache mechanism for temporarily storing data from the host computers, wherein said at least one port executes a request from the host computers and in a time sharing manner, transfers data to be stored on the storage media to other disk controllers, and wherein, when said disk controller has a plurality of ports and all of the ports are being used for online processing, said disk controller selects a port with a light online processing load from the plurality of ports in response to a backup instruction from the host and executes backup processing via the port.

2. The disk controller with the plurality of ports according to claim 1, wherein said disk controller selects a port with a light online processing load from a plurality of ports in response to a backup instruction from the host computers and executes backup processing via the selected port and; at the same time, dynamically checks a load of the selected port to switch from the selected port to another lightly-loaded port even during the backup processing.

3. The disk controller according to claim 2, wherein port switching for the backup processing is done between a plurality of ports across the disk controllers.

4. A disk controller according to claim 1, wherein said bus protocol is the fibre channel protocol.

5. A disk controller for use in a network environment composed of one or more host computers and one or more disk controllers, each of said disk controllers controlling storage media according to an instruction from the host computers, each of said disk controllers comprising:

a plurality of controllers each having at least one port for controlling a bus protocol between the host computers and storage system including said disk controllers; and a cache mechanism for temporarily storing data from the host computers, wherein said at least one port executes a request from the host computers and, transfers data to be stored on the storage media to other disk controllers in a time sharing manner, and wherein, when said disk controller has the plurality of controllers each having a plurality of ports, the disk controller selects a port with a light online processing load from the plurality of ports in response to a backup instruction from the host computer and executes backup processing via the selected port.

6. A disk controller according to claim 5, wherein said bus protocol is the fibre channel protocol.

7. A disk controller for use in a network environment composed of one or more host computers and one or more disk controllers, each of said disk controllers controlling storage media according to an instruction from the host computers, each of said disk controllers comprising:

a plurality of controllers each having at least one port for controlling a bus protocol between the host computers and a storage system including said disk controllers; and a cache mechanism for temporarily storing data from the host computers, wherein said at least one port executes a request from the host computers and, at the same time, transfers data to be stored on the storage media to other disk controllers in a time sharing manner, wherein, when a controller with a port via which backup processing is being executed fails, the controller is switched to another controller without host computer intervention and backup processing is continued via a port of the new controller.

8. A disk controller according to claim 7, wherein said bus protocol is the fibre channel protocol.

9. A disk controller according to claim 7, said controller comprising:

an error controller connected to other controllers, for detecting in said controller, wherein, when said error controller detects errors in said controller, said error controller notifies said other controllers of said detected error.

10. A storage system for data backup comprising:

a plurality of disk devices storing data from a host;

a disk controller connecting to said host and said plurality of disk devices for transferring said data between said host and said plurality of disk devices, wherein said disk controller includes a plurality of port controllers each of which connects to a host and other storage systems, wherein said port controller includes a processor which transfers said data in said plurality of disk devices to said other storage systems and transfers said data between said host and said plurality of disk devices; and a disk array controller, wherein said disk array controller comprises:

a memory which stores performance information of said plurality of port controllers, and a processor which selects one of said plurality of port controllers to execute data backup according to said performance information.

11. A storage system according to claim 10, wherein said processor in said disk array controller stores process type information into said memory, and makes each port controller execute based on said process type information.

12. A storage system according to claim 11, wherein said process type information is at least one of online process only, backup process only and online and backup processes.

13. A storage system according to claim 10, said disk controller further comprises:

a plurality of storage controllers having said disk array controller and a plurality of port controllers, and wherein said disk array and port controllers are connected to each other.

14. A storage system according to claim 13, wherein said processor of said disk array controller in said storage refers to said performance information stored in said memory and performance information stored in a memory of another disk array controller, and selects at least one of said port controllers to execute based on said performance information.

15. A storage system according to claim 14, said disk controller further comprises:

an error controller to detect an error in said disk controller, wherein said error controller connects to said disk array controller and another error controller in another disk controller, and sends an error received from said another error controller to said disk array controller, and wherein said disk array controller makes said port controller continue executing a backup task in response to an error from said error controller.

16. A storage system according to claim 13, wherein said processor in said disk array controller refers to said performance information in said disk controller and performance information in other disk controllers and makes a port controller to continue executing a backup task in said other disk controller.

17. A storage system according to claim 13, wherein said processor in said disk array controller makes said port controllers continue executing a backup task simultaneously.

18. A storage system according to claim 13, said disk controller further comprising:

an interface apparatus having an user interface to indicate a backup task.

19. A storage system according to claim 18, wherein said interface apparatus sets process type information to each said port controller.

20. A storage system according to claim 18, wherein said port controller connects to said host computers and said other storage systems via a fibre channel network.

21. A storage system comprising:

a plurality of controllers, wherein each controller comprises;

a port connected to one or more host computers via a network for receiving a first data transferred from said host computers, a port controller connected to said port for controlling said port, a cache memory connected to said port controller for storing data temporarily, a disk device group, connected to said plurality of controllers, for storing said first data from said host computers, said disk device group including a plurality of disk devices, and wherein said port controller receives said first data from said host computers via said port, sends second data via said port to an external storage system connected to said port via said network, and executes receiving said first data and sending said second data in a time-sharing manner.

22. A storage system according to claim 21, wherein said controller executes backup processing and online processing via said port.

23. A storage system according to claim 21, wherein said disk device group comprises:
a plurality of logical volumes.

24. A storage system according to claim 23, wherein data is duplexed in said disk device group on two different logical volumes while carrying out backup processing.

25. A storage system according to claim 21, wherein if a backup request is sent from a host computer, said controller executes backup processing to said external storage system and duplexing data stored in said disk device group on two different logical volumes for backup processing in a time-sharing manner.

26. A storage system according to claims 25, wherein said duplexing processing and said backup processing are executed in such a way that said duplexing processing and said backup processing are executed in a time-sharing manner or only duplexing processing is executed and said backup processing is executed at some other time.

27. A storage system according to claim 25, wherein a user may specify a time at which said duplexing processing and said backup processing are executed.

28. A storage system according to claim 25, wherein said backup processing executed during said online processing is scheduled in such a way that performance of said online processing is not degraded.

29. A storage system according to claims 28, wherein a user may specify a performance balance between said online processing and said backup processing by scheduling.

30. A storage system according to claim 21, wherein said controller comprises:
a disk array controller connected to said port controller and said disk device group,
wherein said port controller executes backup processing.

31. A storage system according to claim 30, wherein said disk array controller comprises:
a memory for storing a performance of said port controller; and
a processor which includes said port controller for executing said backup processing according to performance information stored in said memory.

32. A storage system according to claim 31, wherein said processor stores process type information in said memory, and said port controller executes processing based on said process type information.

33. A storage system according to claim 32, wherein said process type information is one of online process only, backup process only, and online and backup processes.

34. A storage system according to claim 30, wherein said controllers are connected to each other, and
wherein said processor refers to performance information stored in said memory disposed in said controller and performance information in other controllers stored in said memory disposed in said other controller, and makes said port controller continue executing a backup task in said other controllers.

35. A storage system according to claim 21, wherein said controllers are connected to each other.

36. A storage system according to claim 35, wherein each controller includes:
an error controller to detect an error which occurred in said controller,
wherein said error controller connects to said disk array controller and another error controller in another controller, and sends an error received from said another error controller in said another controller to said disk array controller, and wherein said disk array controller makes said port controller continue executing a backup task in said another controller.

37. A storage system according to claim 21, wherein said controller includes an interface apparatus comprising an user interface to instruct that said port executes one of backup processing only, online processing only and both online processing and backup processing.

38. A storage system according to claim 21, wherein said network is a fibre channel network.

39. A disk controller comprising:
a plurality of controllers;
wherein each controller comprises:
a port connected to one or more host computers via a network for receiving first data transferred from said host computer;
a port controller connected to said port for controlling said port,
a cache memory connected to said port controller for storing said first data transferred from said host computer temporarily,
wherein said controller receives said first data from a host computer via said port, sends record data via said port to a external storage system connected to said port via said network, executes receiving said first data and sending said second data in a time-sharing manner.

40. A disk controller according to claim 39, wherein said plurality of controllers stores said first data in a disk device group connected to said plurality of controllers comprising a plurality of disk devices.

41. A storage system according to claim 40, wherein said disk device group comprises:
a plurality of logical volumes.

42. A storage system according to claim 41, wherein data is duplexed in said disk device group on two different logical volumes while carrying out backup processing.

43. A storage system according to claim 40, wherein if a backup request is sent from a host computer, said controller executes backup processing to said external storage system and duplexing data stored in said disk device group on two different logical volumes for backup processing in a time-sharing manner.

44. A storage system according to claims 43, wherein said duplexing processing and said backup processing are executed in such a way that said duplexing processing and said backup processing are executed in a time-sharing manner or only duplexing processing is executed and said backup processing is executed at some other time.

45. A storage system according to claim 43, wherein a user may specify a time at which said duplexing processing and said backup processing are executed.

46. A storage system according to claim 43, wherein said backup processing executed during said online processing is scheduled in such a way that performance of said online processing is not degraded.

47. A storage system according to claims 46, wherein a user may specify a performance balance between said online processing and said backup processing by scheduling.

48. A storage system according to claim 40, wherein said controller comprises:
a disk array controller connected to said port controller and said disk device group,
wherein said port controller executes backup processing.

49. A storage system according to claim 48, wherein said disk array controller comprises:
a memory for storing a performance of said port controller; and a processor which includes said port controller for executing said backup processing according to performance information stored in said memory.

50. A storage system according to claim 49, wherein said processor stores process type information in said memory, and said port controller execute processing based on said process type information.

51. A storage system according to claim 50, wherein said process type information is one of online process only, backup process only, and online and backup processes.

52. A storage system according to claim 48, wherein said controllers are connected to each other, and
wherein said processor refers to performance information stored in said memory disposed in said controller and performance information in other controllers stored in said memory disposed in said other controller, and makes said port controller continue executing a backup task in said other controllers.

53. A storage system according to claim 39, wherein said controller executes backup processing and online processing via said port.

54. A storage system according to claim 39, wherein said controllers are connected to each other.

55. A storage system according to claim 54, wherein each controller includes:
an error controller to detect an error which occurred in said controller,
wherein said error controller connects to said disk array controller and another error controller in another controller, and sends an error received from said another error controller in said another controller to said disk array controller, and
wherein said disk array controller makes said port controller continue executing a backup task in said another controller.

56. A storage system according to claim 39, wherein said controller includes an interface apparatus comprising an user interface to instruct that said port executes one of backup processing only, online processing only and both online processing and backup processing.

57. A storage system according to claim 39, wherein said network is a fibre channel network.

* * * * *